United States Patent [19]

McCormick

[11] 3,718,412
[45] Feb. 27, 1973

[54] PUMPING SEAL FOR ROTARY PISTON ENGINES

[75] Inventor: Harold E. McCormick, Ballwin, Mo.
[73] Assignee: Ramsey Corporation, St. Louis, Mo.
[22] Filed: Oct. 1, 1971
[21] Appl. No.: 185,580

[52] U.S. Cl. ............................................. 418/142
[51] Int. Cl. .......................................... F01c 19/00
[58] Field of Search .................... 418/140, 142, 144

[56] References Cited

UNITED STATES PATENTS 3,575,541  4/1971  Hamada ............................... 418/152
3,456,624  7/1969  Okamoto .............................. 418/152

*Primary Examiner*—Carlton R. Croyle
*Assistant Examiner*—A. G. Goedde
*Attorney*—Carlton Hill et al.

[57] ABSTRACT

An oil seal for use between the side of a rotary piston engine rotor and the end plate of the rotor chamber, the seal being a cartridge seal including a housing with a seal member received therein and spring means biasing the seal member. The seal member has a sealing face which is grooved, the grooves formed at a non-radial angle, and the grooves acting as an inwardly pumping seal.

11 Claims, 6 Drawing Figures

PATENTED FEB 27 1973
3,718,412
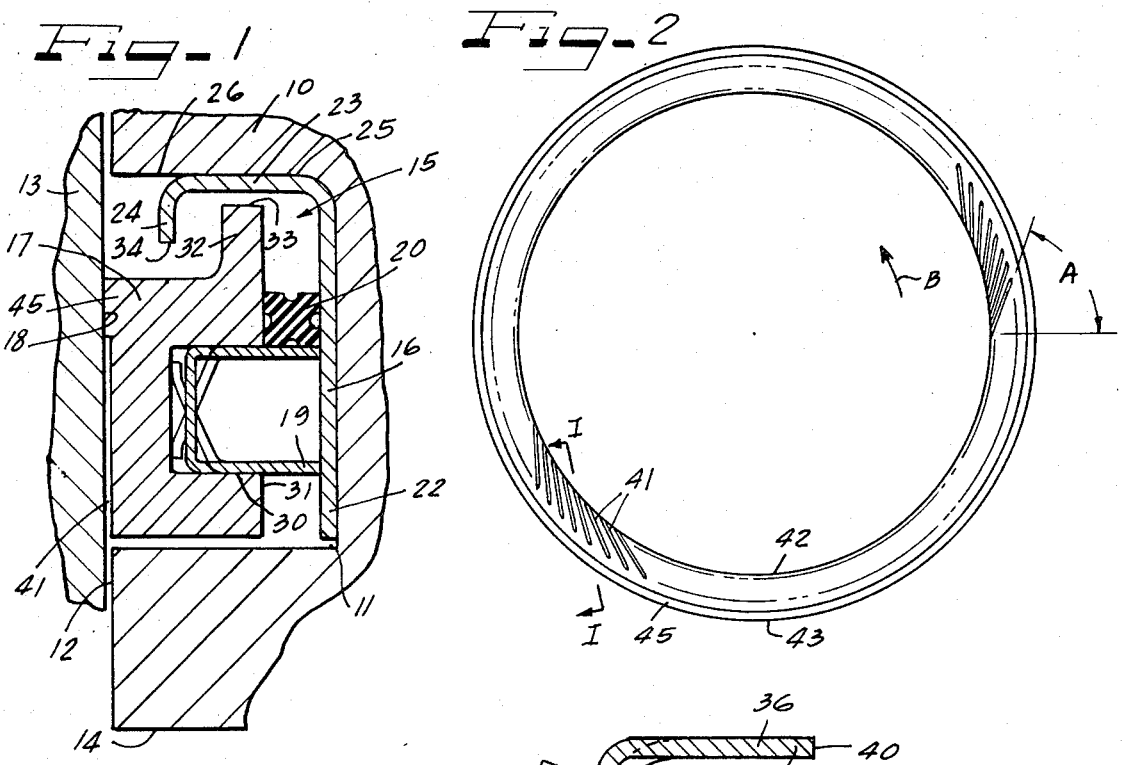
Fig_1  Fig_2  Fig_3  Fig_4
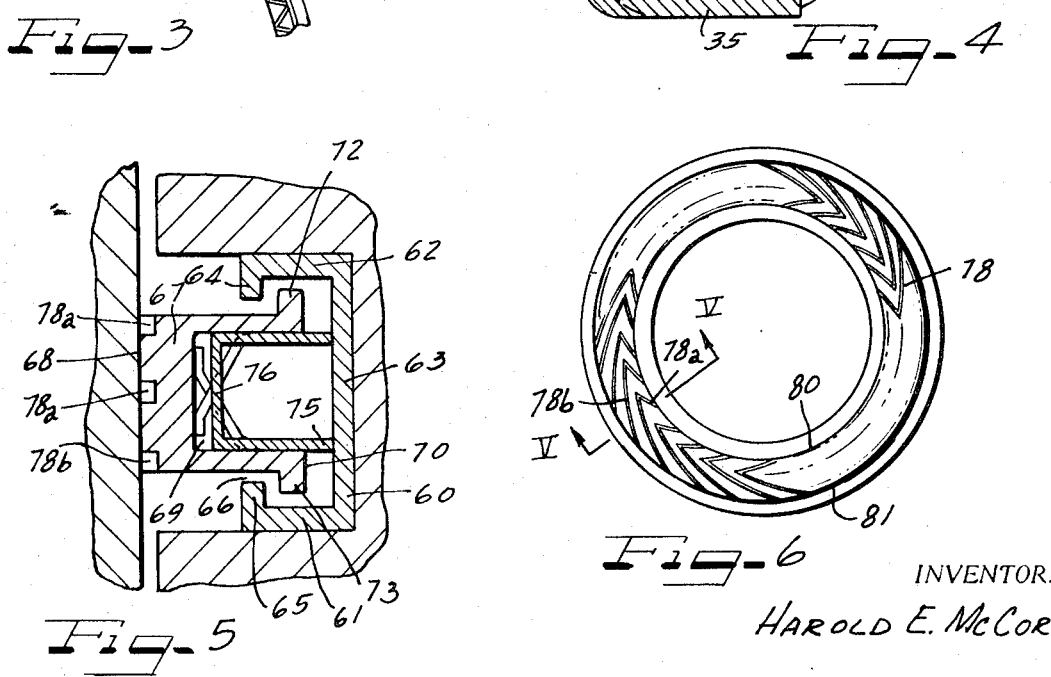
Fig_5  Fig_6
INVENTOR.
HAROLD E. McCORMICK
BY Hill, Sherman, Meroni, Gross + Simpson
ATTORNEYS

PUMPING SEAL FOR ROTARY PISTON ENGINES

BACKGROUND OF THE INVENTION

1. Field of the Invention

This invention relates to internal combustion engine seals and more particularly to an oil seal for use on the rotary piston of a rotary piston engine.

2. Prior Art

Rotary piston engines are known in the art and include, among other configurations, the Wankel type engine which utilizes a three-sided periphery rotor received in a lobed chamber. The rotor has a hollow center through which lubricating oil is passed. The working chambers are between the periphery of the rotor and the inner surface of the chamber. It is therefore desirable to prevent flow of lubricating oil from the center of the rotor outwardly into the chamber. In order to restrict the flow of oil, it has been known to provide a ring groove in the side wall of the rotor intermediate the inner and outer peripheries. The groove receives an oil seal which is urged axially outwardly into contact with the end plates of the housing. The normal prior art seals have usually included only a sealing member and a spring means received in the grooves to urge them outwardly. This has complicated the assembly of the engine requiring individual assembly of the parts into the groove. Further, it has complicated the assembly of the rotor into the chamber, inasmuch as the spring is continuously urging the seal out of the groove. Therefore the seal must be retained in the groove in some manner prior to attachment of the end walls enclosing the rotor chamber.

Additionally, due to the centrifugal action of the moving rotor, the forces acting on the oil have tended to urge them radially outwardly and into the chambers. This has caused an aggravation of the leakage problems encountered in prior art fields.

As a third problem, because the central opening in the rotor can contain lubricating oil when the engine is at rest, it is desirable that the oil seal not only have operating seal properties but also have static seal properties. This has heretofore been accomplished, at times, by the provision of an O-ring seal between a portion of the seal ring and one of the side walls of the groove. These secondary seals have interfered with the axial movement of the ring in the groove.

SUMMARY

My invention overcomes many of the disadvantages of the prior art seals and provides a novel oil seal for use in rotary piston engines.

The seal consists of a J-shaped cross-section housing ring member insertable into the groove in the rotor. A seal member is received in the housing member and is retained therein by radial projection which extends to a point radially beyond an inturned lip of the housing member so as to provide a retaining surface between the projection and the housing member preventing exit of the seal member from the housing member. The seal member has a radially extending axial end face or wall which is grooved for at least a portion of its surface, the grooves each projecting at an angle to a radial line intersecting the seal center so as to provide directional pumping. A spring member is inserted in the housing inwardly of the seal ring to axially urge the seal ring with respect to the housing.

In a modified form of the embodiment, the grooves on the sealing face are bi-angled, that is to say that an adjacent groove projects at a different angle from the grooves to either side thereof in a manner so as to provide directional pumping irrespective of the side of the rotor in which the seal is inserted. A third modification provides a herringbone grooving wherein each groove is bi-directional.

It is therefore an object of this invention to provide a new type of oil seal for rotary piston engines.

It is a primary object to provide an oil seal for rotary piston engines having a grooved sealing face.

It is another object of this invention to provide an oil seal for rotary piston engines, wherein the seal is inwardly pumping.

It is another object of this invention to provide a cartridge-type oil seal for rotary combustion engines wherein the seal faced member is contained in a cartridge housing along with a spring means and which is insertable into the ring groove as a unit.

It is yet another and more particular object of this invention to provide an oil seal for rotary piston engines, the seal member having a grooved face, the groove bi-directional whereby the seal may be insertable on either side of the rotor.

Other objects, advantages and capabilities of the invention will become apparent from the following description taken in conjunction with the accompanying drawings showing a preferred embodiment of the invention.

BRIEF DESCRIPTION OF THE DRAWINGS

FIG. 1 is a fragmentary cross-sectional view of a rotary piston engine rotor and rotor chamber end plate, showing the oil ring groove in the rotor receiving an oil ring assembly according to this invention.

FIG. 2 is a plan view of the sealing face of the seal member of FIG. 1.

FIG. 3 is a fragmentary plan view of a modified seal face according to this invention.

FIG. 4 is a cross-sectional view of the spring ring used in the seal assembly of this invention.

FIG. 5 is a view similar to FIG. 1 illustrating a modified seal assembly.

FIG. 6 is a plan view of a modified sealing face according to this invention.

DESCRIPTION OF PREFERRED EMBODIMENTS

FIG. 1 is fragmentally illustrative of that portion of a rotary piston rotor 10 which includes the oil ring groove 11 extending axially into the material of the rotor from one side wall 12 thereof. The rotor is received in the piston chamber entrapped between two end plates one of which 13 is shown. The ring groove 11 is concentric with the inner diameter of the rotor and spaced from the inner diameter opening 14. The inner diameter opening 14 of the rotor is supplied with lubricant. In order to limit the flow of the lubricant from the inner diameter to the outer diameter or operating area of the chamber, an oil seal 15 is placed in the groove 11.

The oil seal of this invention includes a housing member 16, a sealing member 17 having a sealing face 18, a spring member 19 for urging the sealing member 17 out of the groove 11 and into contact with the end plate 13 and secondary seal 20.

The housing member 16 is J-shaped having a relatively long radially extending leg 22 with a short axially extending leg 23 integral with the radial leg at one end thereof and projecting axially away from the radial leg and terminating in 2 short inturned radial portion 24. The axially extending leg 23 is positioned at the outer diameter of the radially extending leg 22 and is dimensioned so that its outside surface 25 has a diameter substantially equal to the diameter of the outer wall 26 of the groove 11 so that the housing may be snugly fit in the ring groove.

It is to be understood that in a preferred embodiment this may include a press-fit relation which will maintain the housing member in the ring groove insuring adequate sealing between the outer surface of the housing member and the wall of the ring groove.

The seal member itself has its sealing face 18 at one axial end of the seal member 17 and has a substantially centrally located axially extending groove 30 projecting into the ring body from the other axial face 31. A radial projection 32 extends radially outwardly from the axial face 31 and terminates in an outer diameter face 33 having an outer diameter greater than the inner diameter 34 of the radially inturned portion 24 whereby the ring 17, once inserted into the housing 16 will be retained therein by abutment between the radial projection 32 and the radially inturned portion 24.

A spring member 19, best illustrated in FIG. 4, has an inner diameter leg 35 and an outer diameter leg 36 which are interconnected by a radially extending bight section 37 at one axial end of the legs 35 and 36. Spring fingers 38 are struck from the material of the bight section 37 and from axial end portions of the legs 35 and 36. The spring ring 19 is constructed of a spring material whereby the fingers 38, when the ring is in the position illustrated in FIG. 1, will urge the seal ring 17 axially away from the leg 22 of the housing. The ring 19 is received in the groove 30, preferably with a close or snug fit relationship to minimize lubricant leakage and with the free axial ends 39 and 40 of the legs 35 and 36 bottomed against the leg 22 of the housing.

The face 18 of the seal 17, as best illustrated in FIG. 2, has a plurality of grooves 41 extending axially into the material of the ring. The grooves 41 extend from the inner diameter 42 of the ring to a point spaced from the outer diameter 43. The grooves are positioned entirely around the circumference of the ring creating a grooved zone from the inner diameter 42 to a point adjacent to and spaced from the outer diameter and a non-grooved zone from that point to the outer diameter 43. The non-grooved zone 45 functions as a static seal preventing leakage through the grooves when the rotor is not rotating.

Each of the grooves 41 is formed in the material of the ring, at an angle to a radial line illustrated by the angle A of FIG. 2. This angle is preferably between 50° and 80° from a line passing through the center of the seal and intersecting the groove at its innermost point. In one embodiment, an angle of 70° was found to be acceptable. Further, in a preferred embodiment, the grooves are of a spiral nature rather than of a helical configuration with respect to the ring center.

The grooves serve as a hydrodynamic pumping seal and when angled away from the direction of rotation of the seal, as illustrated by the arrow B in FIG. 2, will have the effect of an inwardly pumping seal. Thus not only does the seal of FIGS. 1 and 2 effectively act as an oil seal, but further acts as an inwardly pumping oil seal, to provide a more effective seal for a rotary piston engine.

Because seals are provided at both sides of the rotary piston engine, the seal design illustrated in FIGS. 1 and 2 would require different groove angles for the seals to be used on either side of the rotor. That is to say that the groove angles would have to be reversed from the angle illustrated in FIG. 2 for the seal to be used on the other side of the rotor.

This problem is overcome with the design of FIG. 3 wherein the grooves 47 are V-shape, with the free ends of the V intersecting the free ends of adjacent V's so as to provide a continuous groove around the groove zone. The opposed angles of the two legs in each V provide for a duo-directional pumping seal which can be used on either side as a rotor. It is of course to be understood that the grooves do not have to intersect at the outer diameter area of the grooved zone or at the inner diameter. The grooves may be spaced from one another with adjacent grooves projecting at opposed angles from the diameter.

FIGS. 5 and 6 illustrate a modified form of a seal of this invention wherein the housing member 60 is C shaped having inner 61 and outer 62 diameter axially extending legs interconnected by a radially extending leg 63. Opposite the radially extending leg, two inturned short radially extending legs 64 and 65 projecting from the legs 61 and 62 reduce the clearance of the open end 66 of the housing to a dimension less than the internal dimension of the housing. The seal ring illustrated at 67 has a main body portion with a sealing face 68 at one axial end thereof and a groove 69 extending into the body of the ring from the other axial end 70 thereof intermediate the inner and outer diameters. Radially extending projections 72 and 73 adjacent the end 70 extend beyond the termination of the inturned portions 64 and 65 so as to maintain portions of the ring within the housing. A spring member 75 equivalent to the spring 19 is received in the groove 69 and entrapped between the back wall 76 of the groove and the wall 60 of the housing.

The seal face 68 may be modified from the previously illustrated seal faces as illustrated in FIG. 6. In this case the grooves 78 are herringbone shaped or V-shaped. The grooved zone in this case may extend from the inner diameter 80 to the outer diameter 81 or if desired may be terminated adjacent the outer diameter but spaced therefrom so as to provide a sealing land equivalent to the land 45 of the embodiment of FIG. 1. The herringbone configuration of the grooves again provides for a duo-directional pumping seal whereby the seal is insertable on either side of the rotor. By varying the dimensions of the one leg of the herringbone with respect to the other leg of the herringbone, different pumping effects can be achieved including, if desired the provision of a stable seal which does not pump in either direction.

The seal ring of this invention, in each of the embodiments, may be constructed of standard ring material such as steel, cast iron or the like. Alternatively, the seal may be constructed of a high temperature plastic or a polyimide.

It will therefore be appreciated from the above that my invention provides for a novel form of oil seal for use in rotary piston engines. The seal is cartridge-type having a housing containing the elements of the seal, the housing being insertable into the ring groove of the rotor as a unitary assembly. The housing includes a seal member and a spring means for urging the seal member out of the housing as well as retaining means preventing the seal member from moving completely out of the housing. The seal member has a sealing face on an axial end wall thereof which is grooved for at least a portion of the diameter of the sealing face. The grooves are angled with respect to the diameter of the sealing face so as to provide a directional pumping effect. In the preferred embodiment a portion of the outer diameter of the seal face is not grooved thereby blocking against leakage to the outer diameter of the seal. The inner diameter grooved zone thereafter acts as a directional pumping seal with a radially inward flow. In an alternative embodiment the grooved zone contains grooves extending at opposed angles to one another from the diameter whereby a duo-directional seal is provided. By again blocking off the outer diameter in a non-grooved zone, the seal cannot function as an outwardly pumping seal can only function as an inwardly pumping seal. This allows the seal to be inserted on either side of the rotor.

In an alternative embodiment, a herringbone configuration has been disclosed. In the preferred embodiment illustrated the herringbone is spiral in nature as may be the grooves of the other embodiments.

Although the teachings of my invention have herein been discussed with reference to specific theories and embodiments and although illustrative means for accomplishing explained results have been described, it is to be understood that these are by way of illustration only and that others may wish to utilize my invention in different designs or applications.

I claim as my invention:

1. In an oil seal for use in an oil ring groove in the side wall of a rotary piston, an oil ring having an axial face urged from the groove into contact with the side wall of the end plate enclosing the piston chamber, the improvement of a circumferential grooved zone on said axial face and a circumferential ungrooved zone on said axial face, the said ungrooved zone positioned adjacent the outer periphery of the axial face and the said grooved zone positioned radially inwardly thereof and communicating to the inner diameter of the said axial face, the said grooved zone having a plurality of circumferentially spaced grooves therein, the said grooves spaced from one another by ungrooved areas and the said grooves angled away from the radius to impart an inward pumping action to the said oil ring.

2. An oil ring assembly for use in rotary piston internal combustion engines, the piston having a ring groove in a side wall thereof, the assembly comprising a ring-shaped housing member, a sealing ring received within said member, the sealing ring having interior and exterior radially extending axial end walls, the said exterior end wall having thereon a sealing face, the said sealing face having a grooved zone extending radially outwardly from the inner diameter of the said ring, an ungrooved zone extending from the outer diameter of the grooved zone to the outer diameter of the ring, the said grooved zone having a plurality of circumferentially spaced apart grooves therein, the said grooves open to the inner diameter, the said grooves extending outwardly at an angle to the radius, and means urging the sealing ring out of the said housing member.

3. The assembly of claim 2 wherein the inner axial end wall has a circumferential groove extending into the ring body therefrom, a spring member received in the said groove, the spring member bottomed against a bottom wall of the said groove and against a radially extending wall of the said housing, the said spring member effective to urge the said sealing ring away from the said radial wall of the said housing.

4. The assembly of claim 3 wherein the said seal ring has a radial projection adjacent the said interior axial end wall, the radial projection extending radially outwardly from the outer diameter of the ring, the housing member having a radial projection thereon, the said radial projection of the housing member extending radially inwardly from the outer diameter of the housing member, the said radial projections overlapping one another and effective to prevent exit of the seal ring from the said housing, the said seal ring movable in the said housing until abutment between the radial projections.

5. The assembly of claim 2 wherein the said grooved zone has alternate grooves projecting at opposite angles to the radius.

6. The assembly of claim 2 wherein the grooves are curved with respect to the axis of the ring in the manner of a spiral.

7. The assembly of claim 2 wherein the grooves are V-shaped circumferentially in the manner of a herringbone.

8. The assembly of claim 2 wherein the said housing member is press fitted into the said ring groove in sealing relation with a side wall of the said ring groove.

9. The assembly of claim 8 wherein the said assembly includes a secondary seal interior of the said housing member sealing the space between the housing and the interior axial end wall of the said sealing ring.

10. An oil seal assembly for use in connection with rotary piston engines, the pistons having a ring groove in one side wall thereof, the ring groove open axially, the assembly comprising: a housing member receivable in said ring groove, a seal ring received in said housing member and projecting axially thereof, a spring member entrapped between a portion of the housing member and a portion of the seal ring effective to urge the seal ring axially out of the said housing, overlapping radial abutment members on said housing and the said seal ring preventing exit of the seal ring from the said housing, an axial end wall on the said seal ring, the axial end wall providing a sealing surface, the said axial end wall having a plurality of circumferentially spaced grooves therein, the said grooves extending outwardly from the inner diameter of said ring, each of the said grooves formed in the said ring at an angle to a radial line, and the said grooves making the said ring inwardly pumping.

11. The assembly of claim 10 wherein the grooves are V-shaped circumferentially in the manner of a herringbone.

* * * * *

UNITED STATES PATENT OFFICE
CERTIFICATE OF CORRECTION

Patent No. 3,718,412         Dated February 27, 1974

Inventor(s) Harold E. McCormick

It is certified that error appears in the above-identified patent and that said Letters Patent are hereby corrected as shown below:

Column 4, line 49, after "are" insert --each--;

line 50, after "shaped" insert --with a leg portion 78A extending from the inner diameter 80 and angled radially outward in a clockwise direction as viewed in Fig. 6 to mate with a leg portion 78B angled radially outward in a counterclockwise direction and extending to the outer periphery 81.--

Column 6, after claim 11, add claim 12 as follows:

--12. The oil seal of claim 1 including grooves in the ungrooved portion mating with the grooves in the grooved portion and angled from the radius in a direction opposite the said grooves to provide a herringbone grooved configuration effective to make the ring inwardly pumping in both clockwise and counterclockwise directions of rotation of the ring.--

Signed and sealed this 2nd day of July 1974.

(SEAL)
Attest:

EDWARD M. FLETCHER, JR.  
Attesting Officer

C. MARSHALL DANN  
Commissioner of Patents